United States Patent [19]

Itakura et al.

[11] Patent Number: 4,558,020

[45] Date of Patent: Dec. 10, 1985

[54] CERAMIC HIGH DIELECTRIC COMPOSITION

[75] Inventors: Gen Itakura, Hirakata; Hideki Kuramitsu, Moriguchi; Takashi Iguchi, Katano; Takayuki Kuroda, Nishinomiya; Kaneomi Nagase, Kyoto, all of Japan

[73] Assignee: Matsushita Electric Industrial Co., Ltd., Kadoma, Japan

[21] Appl. No.: 474,680

[22] PCT Filed: Jul. 2, 1982

[86] PCT No.: PCT/JP82/00252

§ 371 Date: Mar. 7, 1983

§ 102(e) Date: Mar. 7, 1983

[87] PCT Pub. No.: WO83/00145

PCT Pub. Date: Jan. 20, 1983

[30] Foreign Application Priority Data

Jul. 8, 1981 [JP] Japan .................. 56-107257

[51] Int. Cl.$^4$ ............................. C04B 35/46
[52] U.S. Cl. ..................... 501/137; 361/322
[58] Field of Search ............ 501/137, 139, 138; 361/313, 320–322

[56] References Cited

U.S. PATENT DOCUMENTS

| | | | |
|---|---|---|---|
| 4,014,707 | 3/1977 | Tanaka et al. | 501/139 |
| 4,073,989 | 2/1978 | Wainer | 428/131 |
| 4,096,098 | 6/1978 | Umeya et al. | 501/137 |
| 4,222,783 | 9/1980 | Atsumi et al. | 501/139 |

FOREIGN PATENT DOCUMENTS

| | | | |
|---|---|---|---|
| 2054653 | 6/1973 | Fed. Rep. of Germany | 501/137 |
| 50-35222 | 11/1975 | Japan . | |
| 51-76597 | 7/1976 | Japan | 501/137 |
| 52-72499 | 6/1977 | Japan | 501/137 |
| 52-70398 | 6/1977 | Japan | 501/137 |
| 55-53006 | 4/1980 | Japan . | |
| 755860 | 8/1956 | United Kingdom | 501/137 |

OTHER PUBLICATIONS

Ceramic Industry, Jan. 1967, p. 44, "Calcium Titanate".
Dictionary of Mining, Mineral and Related Terms-pub. by Dept. of Interior (1968) p. 809, "Perovslsite".
Graf, R. G., "Effect of Impurities Upon the Dielectric Properties of Barium Titanate", Ceramic Age (Dec. 1951) pp. 16 and 18–19.

Primary Examiner—Helen M. McCarthy
Attorney, Agent, or Firm—Cushman, Darby & Cushman

[57] ABSTRACT

This invention relates to ceramic high dielectric composition with $BaTiO_3$ as major component; and by containing 1–5 weight part of $CaTiO_3$, 2–3 weight parts of $Nb_2O_5$ to 100 weight parts of the $BaTiO_3$, a composition having dielectric constant of 3000 or above, less voltage dependency, a large bending strength and good high frequency characteristic is provided; and it has a good characteristic when used as thin film type dielectric body like multilayered ceramic capacitor.

1 Claim, 3 Drawing Figures

CERAMIC HIGH DIELECTRIC COMPOSITION

TECHNICAL FIELD

The present invention relates to ceramic high dielectric composition to be used mainly as capacitor.

BACKGROUND ART

Hitherto many proposals have been made on ceramic high dielectric compositions with barium titanate as host material, and they have been used specially for disc type ceramic capacitors.

The barium titanate is a material having ferrodielectric characteristic, and its Curie point lies around 120° C. Demarcated by this 120° C., in the lower temperature side thereof it becomes tetragonal, and in the upper temperature side thereof it becomes cubic. And it is well known that in the tetragonal region it shows ferrodielectric characteristic and in the cubic region it shows paraelectric characteristic.

Since, ceramic of such sole barium titanate has a very large change of dielectric constant dependent on temperature and also has a large dielectric dissipation in a temperature range of about normal temperature, it is hardly used as capacitor independently; and hitherto devices are made to shift the Curie point to around the normal temperature, and to decrease the temperature dependency by adding various additives. $CaTiO_3$, $BaZrO_3$, $SrTiO_3$, $BaSnO_3$ or the like are known as representative of the additives. By adding these appropriately and by adjusting with a small amount constituent, material having characteristics of X7R, Y5T, Y5V, Z4V or the like of EIA standard are provided.

The fact is that these materials are hitherto utilized generally as ceramic capacitors of thick disc type, for instance having 0.5-1 mm thickness of element.

In these years, miniaturization of capacitors is progressing corresponding to miniaturization of various electronics-related components, and the most in multiple layer ceramic capacitors. The multiple layer ceramic capacitor is that in which ceramic dielectric body is made into thin film of around 25-100 μm and sandwiched with comb type electrodes to form a multiple layer construction; and since a ratio of electrodes area to electrode gap can be made very large, its capacitance per volume can be made as large as 100 times or larger in comparison with the ceramic disc type capacitor, and the same capacitance can be assured with as small volume as 1/10 or less, and therefore miniaturization is very easy.

When such ceramic dielectric thin film is used, however, it is the fact that conventional disc type ceramic composition can not be used as it is. That is, since a voltage per unit length is loaded 10 times or more than the conventional case, a material having small voltage-dependencies of ceramic dielectric constant and small dissipation factor become to be needed. Besides, due to recent direct bonding system onto printed circuit board, a strong material which is not destroyed by bending of the print circuit board is needed. Further, since the frequencies are shifted to higher band of high sensitivities, those which have good high frequency characteristics become necessary. Especially, those having characteristic of YD in JIS (Japanese Industrial) standard or characteristic of Y5T in EIA (Electronic Industries Association) standard are requested by a large number in relation to electronic tuner, those which have dielectric constant of 3000 or above and tan δ of 2.0% or lower and low equivalent series resistance at frequency band of 1-100 MHz are requested.

DISCLOSURE OF THE INVENTION

Accordingly, the present invention is to provide ceramic high dielectric composition having dielectric constant as high as 3000 or above, small voltage dependency, large bending strength and good high frequency characteristics, by containing as additive 1-5 weight parts of $CaTiO_3$ and 2-3 weight parts of $Nb_2O_5$ to 100 weight parts of $BaTiO_3$.

THE BEST MODE FOR CARRYING OUT THE INVENTION

Figure 1:
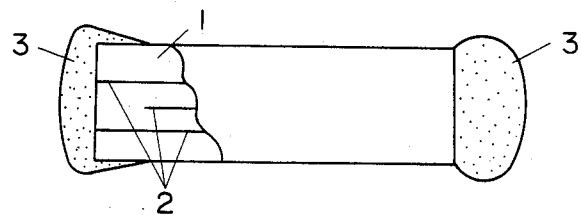
FIG. 1 is a partially sectional front view of a multiple layer ceramic capacitor trially made by using the composition of the present invention.

As a result of accumulation of various experiments, the inventors propose a ceramic high dielectric composition having barium titanate ($BaTiO_3$) as host material and additives of calcium titanate ($CaTiO_3$) and niobium oxide ($Nb_2O_5$) and depending on necessity small amount of additive(s), and being of different group from the conventional compositions, and the present invention is hereafter elucidated with reference to embodiments.

For 100 weight parts of $BaTiO_3$ (of 98% or higher purity), various additives are added and sufficiently mixed in a ball mill. The mixture is added with a small amount of 5% aqueous solution of PVA (polyvinylalcohol), then blended in mortar and filtrated through 30 mesh sieve to be granulated. The granulated powder is put in a die having inner diameter of 13 mm and molded in a shape of 13 mm diameter and 0.5 mm thickness by application of a pressure of 1 ton/cm². Also in the same way, a mold of 4.7 mm×12.5 mm×1.5 mm size is formed by means of a rectangle die of 4.7 mm×12.5 mm size. These molds are sintered at 1250°-1400° C. for 1-5 hours. Then, on both disc face of each sintered body silver electrodes are provided.

The below mentioned Table 1 shows characteristics of the sintered body obtained for various additive constitutents. In the table, $\epsilon_{25}$ shows dielectric constant obtained from capacitance measured with 1 KHz AC 1 V and tan δ shows dissipation factor at that time. I.R shows insulation resistivity measured with DC 50 V, B.D.V shows breakdown voltage and AC-V shows tan δ measured under an AC voltage of effective value 50 V/mm, with 1 KHz. Further, TC shows change rate of capacitance measured at −30° C. and +85° C. taking 20° C. as reference.

TABLE 1

| Sample Number | Additive constituent | | | | | $\epsilon_{25}$ | tan δ (%) | I.R (Ω·cm) | B.D.V (KV/mm) | AC-V (%) | TC (%) | | Constant of bending strength (Kg/cm²) |
| --- | --- | --- | --- | --- | --- | --- | --- | --- | --- | --- | --- | --- | --- |
| | CaTiO₃ | Nb₂O₅ | MnO₂ | CeO₂ | SiO₂ | | | | | | −30° C. | +85° C. | |
| ※1 | 0 | 2.5 | 0.2 | 0.2 | 0 | 2416 | 1.5 | 2 × 10¹³ | 13 | 5.0 | −5.2 | −26.5 | 980 |
| 2 | 2.0 | 2.0 | 0.2 | 0.2 | 0 | 3330 | 1.0 | 5 × 10¹³ | 17 | 2.1 | −7.3 | −31.1 | 970 |
| 3 | 2.5 | 2.5 | 0.2 | 0.2 | 0 | 3550 | 1.1 | 3 × 10¹³ | 18 | 1.5 | −5.8 | −32.1 | 910 |
| 4 | 3.0 | 2.5 | 0.2 | 0.1 | 0 | 3456 | 1.2 | 2 × 10¹³ | 23 | 1.7 | −2.3 | −34.1 | 960 |
| 5 | 3.0 | 2.0 | 0.2 | 0.1 | 0 | 3243 | 0.9 | 7 × 10¹³ | 18 | 1.3 | −3.2 | −32.3 | 930 |
| 6 | 3.0 | 2.0 | 0.2 | 0 | 0 | 3352 | 0.8 | 7 × 10¹³ | 19 | 1.5 | −7.9 | −32.0 | 1200 |
| 7 | 5.0 | 3.0 | 0 | 0.3 | 0 | 3026 | 0.6 | 8 × 10¹³ | 15 | 0.9 | −1.0 | −33.0 | 920 |
| ※8 | 7.0 | 2.5 | 0.2 | 0.2 | 0 | 2136 | 0.5 | 2 × 10¹⁴ | 21 | 0.8 | +0.6 | −40.6 | 930 |
| ※9 | 3.0 | 5.0 | 0.2 | 0.2 | 0 | 1993 | 0.7 | 6 × 10¹³ | 27 | 3.8 | +3.2 | −43.7 | 680 |
| 10 | 3.0 | 1.5 | 0.2 | 0.2 | 0 | 3736 | 1.2 | 3 × 10¹³ | 15 | 2.6 | −12.6 | −27.9 | 1100 |
| 11 | 3.0 | 2.5 | 0.2 | 0.3 | 0 | 3368 | 0.8 | 8 × 10¹³ | 13 | 1.3 | −8.3 | −29.8 | 770 |
| ※12 | 3.0 | 2.5 | 0.2 | 0.5 | 0 | 3508 | 0.9 | 5 × 10¹³ | 16 | 1.5 | −3.6 | −28.6 | 560 |
| ※13 | 3.0 | 2.5 | 0.5 | 0.2 | 0 | 3603 | 1.4 | 2 × 10¹³ | 14 | 4.2 | −6.6 | −31.2 | 860 |
| ※14 | 3.0 | 2.5 | 0.8 | 0.2 | 0 | 3423 | 2.2 | 4 × 10¹² | 9 | 5.2 | −5.3 | −36.3 | 930 |
| 15 | 3.0 | 2.5 | 0.2 | 0.2 | 0.5 | 3262 | 0.7 | 1 × 10¹⁴ | 23 | 1.1 | −7.3 | −31.1 | 1310 |
| 16 | 3.0 | 2.5 | 0 | 0 | 0.5 | 3186 | 0.6 | 3 × 10¹⁴ | 20 | 0.9 | −6.8 | −29.8 | 1240 |
| ※17 | 3.0 | 2.5 | 0 | 0 | 1.0 | 2871 | 1.8 | 2 × 10¹³ | 11 | 2.9 | −6.9 | −30.7 | 520 |

(※these are for reference and are outside the scope of claims.)

As is obvious from the Table 1, it is observed that the composition of the present invention is small in capacity change under AC voltage, and strong in bending strength. Since in the conventional constituent with addition of BaZrO₃, BaSnO₃ or SrTiO₃ the AC voltage characteristic, namely, tan δ value under 50 V/mm, has been as high as about 3–7, and bending strength has been as low as 600–700 Kg/cm², they are considered a very much satisfactory characteristics.

Figure 2:
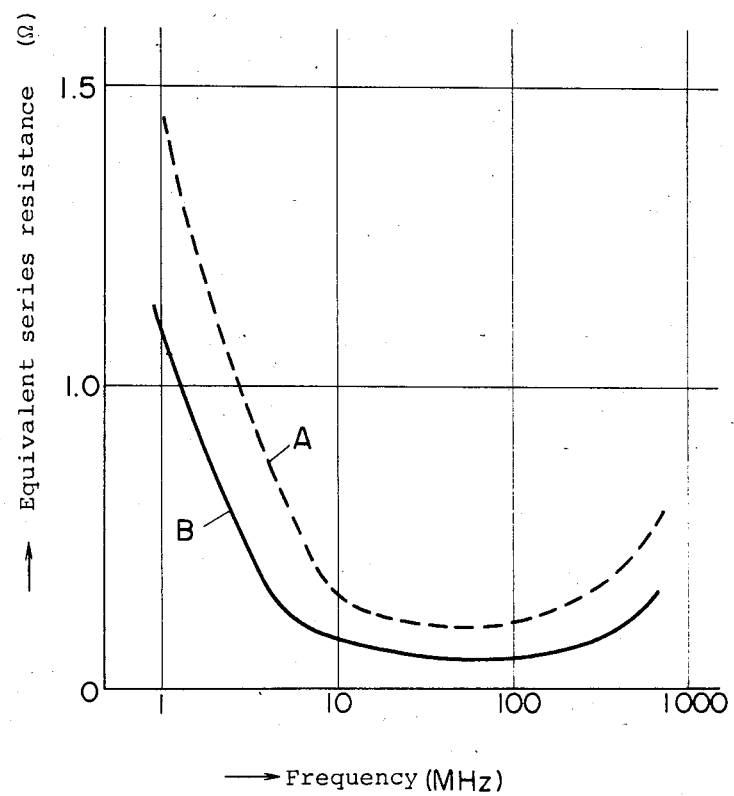
FIG. 2 is a graph showing frequency characteristics of equivalent series resistance of the same ceramic capacitor.

Table 2 shows results of characteristics obtained by trially making multilayered ceramic capacitor like the one in FIG. 1 by using the composition of the sample No. 15 of the Table 1, and then examining the characteristics. In FIG. 2, characteristics of capacitors trially made by using conventional representative composition prepared by adding 3 weight parts of BaZrO₃, 0.4 weight part of MgTiO₃ and 0.2 weight parts of MnO₂ to 100 weight parts of BaTiO₃ are also shown. In this case, dimension is 3.07 mm×1.56 mm×0.56 mm. Incidentally in FIG. 1, numeral 1 designates ceramic dielectric body, 2 palladium electrodes, and 3 electrodes (Ag electrodes). In the Table 2, C and tan δ are values measured with 1 KHz AC 1 V. I.Re is insulation resistivity measured with DC 50 V, and B.D.Ve is breakdown voltage. The bending strength is a pressure immediately before destruction of element when the element is held with 25 mm span and center part of the element is pressed with a knife of 0.5 mm thick edge.

TABLE 2

| | C (pF) | tan δ (%) | I.Re (Ω) | B.D.Ve (KV) | TC (%) | | Bending Strength (Kg) |
| --- | --- | --- | --- | --- | --- | --- | --- |
| | | | | | −30° C. | +85° C. | |
| Constituent of the present invention (No. 15) | 2350 | 0.7 | 5 × 10¹² | 2.3 | −3.2 | −28.5 | 3.4 |
| Conventional constituent group with additive of BaZrO₃ | 2320 | 2.8 | 2 × 10¹² | 1.6 | +1.3 | −31.2 | 1.8 |

Figure 3:
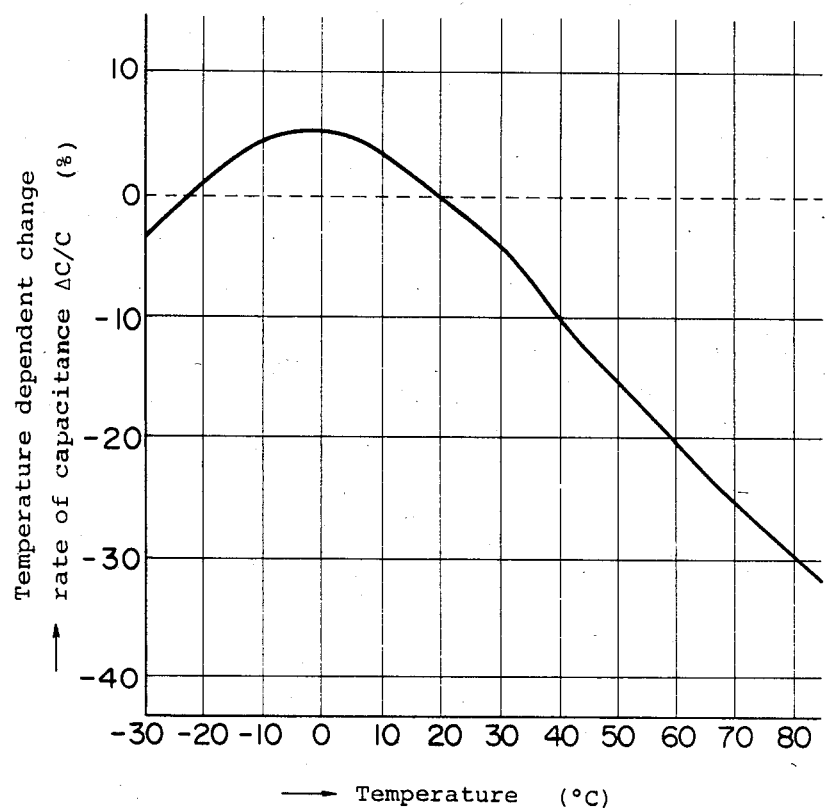
FIG. 3 is a graph showing temperature dependent change rate of the same.

FIG. 2 shows frequency characteristic of equivalent series resistance. It is clear that as compared with a characteristic A of the capacitor by the conventional constituent, a characteristic B of the capacitor of the present invention trially made by the sample No. 15 has good characteristic in high frequency range. FIG. 3 shows temperature change rate of the same capacitor trially made by the present invention.

POSSIBLE UTILIZATION IN INDUSTRY

As has been explained above, according to the ceramic high dielectric composition of this invention, there are good characteristics when used as thin film type dielectric body such as multilayered ceramic capacitor. That is, it has a constituent to meet recent market needs in having high dielectric constant of 3000 or above, having strong bending strength and having small equivalent series resistance in high frequency, and has particularly high utility in the region of electronic tuner or the like.

We claim:

1. A ceramic high dielectric composition which consists of 1 to 5 parts by weight of CaTiO₃ and from 2 to 3 parts by weight of Nb₂O₅ per 100 parts by weight of BaTiO₃ as the host material.

* * * * *